(12) United States Patent
Zampini et al.

(10) Patent No.: US 11,365,152 B2
(45) Date of Patent: Jun. 21, 2022

(54) CEMENT-FREE POROUS SUBSTRATE FOR PLANT GERMINATION AND GROWTH MADE OF ALKALI-ACTIVATED POZZOLANS

(71) Applicant: CEMEX INNOVATION HOLDING LTD., Zug (CH)

(72) Inventors: Davide Zampini, Zug (CH); Alexandre Guerini, Lyss (CH); Julien Chapelat, Biel/Bienne (CH); Mark Gregory Lefsrud, Hudson (CA); Yasmeen Hitti, Montreal (CA)

(73) Assignee: CEMEX RESEARCH GROUP AG, Brugg Bei Biel (CH)

( * ) Notice: Subject to any disclaimer, the term of this patent is extended or adjusted under 35 U.S.C. 154(b) by 188 days.

(21) Appl. No.: 16/761,104

(22) PCT Filed: Nov. 6, 2017

(86) PCT No.: PCT/EP2017/078361
§ 371 (c)(1),
(2) Date: May 1, 2020

(87) PCT Pub. No.: WO2019/086134
PCT Pub. Date: May 9, 2019

(65) Prior Publication Data
US 2020/0352119 A1 Nov. 12, 2020

(51) Int. Cl.
| | |
|---|---|
| *C04B 28/02* | (2006.01) |
| *A01G 24/17* | (2018.01) |
| *A01G 24/15* | (2018.01) |
| *C04B 18/02* | (2006.01) |
| *C04B 28/08* | (2006.01) |
| *C04B 20/00* | (2006.01) |
| *A01G 24/13* | (2018.01) |
| *A01G 24/44* | (2018.01) |

(52) U.S. Cl.
CPC .......... *C04B 28/021* (2013.01); *A01G 24/15* (2018.02); *A01G 24/17* (2018.02); *C04B 18/02* (2013.01); *C04B 20/0076* (2013.01); *C04B 28/08* (2013.01); *A01G 24/13* (2018.02); *A01G 24/44* (2018.02)

(58) Field of Classification Search
CPC ........ A01G 24/13; A01G 24/15; A01G 24/17; A01G 24/18; A01G 24/44; C04B 18/02; C04B 20/0076; C04B 28/021; C04B 28/08
See application file for complete search history.

(56) References Cited

U.S. PATENT DOCUMENTS

| | | |
|---|---|---|
| 5,296,180 A | 3/1994 | Hayes et al. |
| 2006/0117655 A1 | 6/2006 | Bodycomb et al. |
| 2010/0058957 A1 | 3/2010 | Boxley |
| 2014/0264140 A1 | 9/2014 | Gong et al. |
| 2017/0044077 A1 | 2/2017 | Yang |

FOREIGN PATENT DOCUMENTS

| | | |
|---|---|---|
| DE | 19822621 A1 | 12/1998 |
| WO | 2011086518 A1 | 7/2011 |
| WO | 2017064444 A1 | 4/2017 |

OTHER PUBLICATIONS

Concrete-Specification, Performance, Production and Conformity, BSI Standards Publication BS EN 206:2013.
International Search Report for International Application No. PCT/EP2017/078361; International Filing Date Nov. 6, 2017; dated Jul. 31, 2018; 4 pages.
Kim, Hwang-Hee et al., "Performance Evaluation and Field Application of Porous Vegetation Concrete Made with By-Product Materials for Ecological Restoration Projects", Sustainability 2016, 8, 294; doi:10.3390/su8040294; 16 pages.
Written Opinion of the International Searching Authority for International Application No. PCT/EP2017/078361; International Filing Date: Nov. 6, 2017; dated Jul. 31, 2018; 7 pages.

*Primary Examiner* — Anthony J Green
(74) *Attorney, Agent, or Firm* — Cantor Colburn LLP

(57) ABSTRACT

The present invention concerns a Portland cement-free porous rigid mineral substrate made of alkali-activated pozzolans, a method for preparing the same, and use of said substrate to optimize plant germination and growth.

15 Claims, 4 Drawing Sheets

CEMENT-FREE POROUS SUBSTRATE FOR PLANT GERMINATION AND GROWTH MADE OF ALKALI-ACTIVATED POZZOLANS

CROSS-REFERENCE TO RELATED APPLICATIONS

This Application is the U.S. National Stage Application of PCT/EP2017/078361, filed Nov. 6, 2017, which is incorporated by reference in its entirety herein.

FIELD OF THE INVENTION

The present invention relates to a Portland cement-free porous substrate for plant germination and growth, essentially made of alkali-activated pozzolans, with compressive strength at 28 days between 3 MPa and 10 MPa and porosity between 25% and 40% in the hardened state. Particularly, the present invention relates to a Portland cement-free porous substrate for plant germination and growth manufactured with a pozzolan material, such as fly ash or slag, without using cement based products. The invention also relates to a process for producing such a substrate.

BACKGROUND OF THE INVENTION

Plants have always played an important role in human development throughout history. Not only are they an important ingredient in the development of medicines, but they are also cultivated due to their beauty, fragrance and nutritional properties as they are the basis for many diets worldwide. On top of a significant amount of the population being exclusively vegetarian, vegetables are a main side dish for omnivores, making seed plants a significant source of nutrients for humans. Consequently, it is not strange that agriculture is such an old activity for mankind.

Rock wool, a lightweight hydroponic substrate, is one of the most well-known hydroponic growing mediums. It is made by melting basaltic rock and spinning it, forming extremely thin fibres that bunch together. Although the raw materials are natural, the fibres are non-biodegradable and will sit in landfills for a long time. Also, rock wool materials are a source of dust and their loose fibres can get into eyes, mouth, skin and lungs. Furthermore, rock wool cannot be manipulated (for example, by means of a robot) since they have no mechanical resistance, needing a frame or a substrate to do so. Therefore, there is the need to identify a more sustainable, less harmful material as effective as rock wool for hydroponics.

One material that could be a solid alternative to rock wool for hydroponics is permeable concrete. Concrete releases no dust or fibres and it is safe to handle. Also, at the end of its service life, concrete can be recycled into aggregates and re-used in fresh concrete. But fresh concrete has a pH around 12.5, too high for seedlings and growing vegetation. Yet, many inventions disclose cementitious materials for hydroponics, without giving any information related to the feasibility of the actual sprouting:

TW201100349 discloses a pervious plant-growing concrete composed of Portland cement, blast furnace slag, silica fume, quartz sand, crushed coarse aggregate, super plasticizer and water. The permeable concrete is poured, rolled to form a pavement and, when hardened, soil is scattered. Consequently, a roller or paver, as well as tools to scatter the soil are needed, which add complexity to the invention. Also, because soil is still needed, this invention is not a real alternative to rock wool.

DE19822621 uses granulates made from porous concrete and mixes them with quartz sand, lime, cement, natural gypsum, aluminium powder and water to form a product that can be used as vegetation layer for roof greening. Although the final function is also as a vegetation layer, the material formulation uses concrete, cement, aluminium powder, all materials that are not necessary and are detrimental in the present application.

US20170044077 discloses a foamed concrete, whereby cement, water and a pozzolanic material (called "admixture") are mixed to form a paste; after a foam agent is added to this paste to create foamed concrete, which is then cured and crushed to form aggregates that are added to hydrogel to form "soil concrete". Plant nutrients, microorganisms, moisture and the like are added to the "soil concrete" by being incorporated in the hydrogel. But hydrogel has poor mechanical strength, so it is hard to be manipulated. Also, it is prone to bacterial growth and there are around 200 types of bacteria that are known to cause diseases in plants.

Hwang-Hee Kim et al. (*Performance Evaluation and Field Application of Porous Vegetation Concrete Made with By-Product Materials for Ecological Restoration Projects*) uses cement porous concrete overlaid with layers of soil, which is needed for sprouting. The present invention avoids both soil and cement, consequently it provides a simpler substrate for plant growth and germination, which can be reused only by rising, not needing extra materials apart from water and the seeds one wants to germinate (for example, soil is not needed).

US20100058957 teaches how to produce a pervious concrete from geopolymerized pozzolanic ash but no teaching related to a process that enables the development of seeds in such substrate. Moreover, there is no teaching regarding the aggregates' dimensions or how to select them to attain a certain porosity of the final material, which is an important parameter for root development when growing vegetation.

WO2017064444 discloses a vertical element comprising a porous concrete; at least one of the surfaces has a coating which is a render made of soil, nutrients, vegetable or seeds of a vegetable and possibly cement and has a porosity value between 10% and 40%. Cementitious concrete is strongly basic (pH of 12 to 13), which can affect the sprouting and life span of the vegetation. This narrows down the vegetation that can be planted in such a structure, which is limited to plants that thrive in dry and alkali environments. Plant species for human consumption will die or not even germinate in such conditions. As a result, an alternative that does not involve cement but that renders a structure with similar properties is sought. Additionally, aggregates above 4 mm are exclusively used in this application, which results in higher pore size and consequently low capillarity, diminishing the capability of water and nutrients to reach the plants. Further, the paste volume claimed is higher than 150 L/m$^3$ which leads to a strong matrix that hinders the roots' growth and expansion.

WO2011086518 discloses a module made of a concrete material or ceramic powder which has at least one porous surface, wherein the pores are interconnected to allow air and water to circulate, as well as to allow plant roots to develop. The interconnected pores are thinner on the outside of the module than on the inside, where they are larger. The module also has a substrate made of soil. There is no guidance as to how to produce said module, apart from a reference to other publications that disclose materials based on ceramics, neither on how to attain the porosity mentioned.

Studies were done to test the usage of cementitious materials as substrates for agricultural purposes to substitute rock wool as a substrate for plant growing. Nevertheless, successfully growing crops proved hard, as new plants died due to the harsh concrete conditions. The prior art failed to reveal a product based on concrete materials that could successfully substitute rock wool as a hydroponic or aeroponic medium for plant growing and crop rotation, whereas the present invention can be reused or easily recycled, which is also not the case with rock wool.

DESCRIPTION OF THE INVENTION

The inventors have discovered a process to produce a porous substrate based on concrete materials that has the same properties as cement-based structures but without the harmful effects of cement in plant germination, for example, the high pH associated with cementitious mixtures. The substrate hereby disclosed has high mechanical strength. It does not need reinforcement, neither an extra support to be used, being sturdy on its own; it can be handled manually, reused and recycled.

High alkalinity of the final substrate, as well as low strength and poor setting times have been common causes to dismiss alkali-activated binders as main material to produce substrates for plant germination and growth. All these parameters have been optimized in the present invention.

The technology behind this new product and process allows seeds to be placed inside a porous substrate made of an alkali-activated binder to germinate hydroponically. Water should be added to the substrate so that water is able to wet the material through capillary action, under most cases this is approximately ⅓ to ½ the height of the substrate. Enough light should be provided, wherein the amount of light needed will depend on the species being cultivated. Proper temperature should also be maintained; although optimal temperature also depends on the species being cultivated, 15° C. to 25° C. is advisable.

Several types of plants can be cultivated according to the method, including edible plants—tomatoes, lettuce, radish, etc. But the final application is not limited to growing edible vegetations, but it can also be for controlled environment agriculture, sports turf or green infrastructure (for example, green roofs, green walls, eco-restoration, etc.) Therefore, the vegetation that can grow according to this method is not limited to vegetables, but also grass, turf, etc.

Hereby disclosed is a Portland cement-free porous rigid mineral substrate to optimize plant germination and growth, with a final compressive strength after hardening between 3 MPa and 10 MPa and porosity between 25% and 35%, comprising:
- a binder composed or consisting of pozzolanic material, said pozzolanic material representing 100% of the binder weight;
- at least one alkaline activator;
- a water-to-binder ratio between 0.2 and 0.4;
- a paste volume between 75 and 120 l/m$^3$;
- between 1400 kg and 1600 kg of aggregates per m$^3$ of concrete, said aggregates with Dmax of 4 mm;
  whereas the aggregates have a D90/D10 comprised between 1 and 3.5, whereas D90 is selected to be located between 3 and 3.5 mm and the D10 is equal or larger than 1.5 mm, the aggregates being characterized by the fact that the natural packing solid is between 55% and 65% (v/v).

Preferably, the binder consists of aluminosilicate minerals, selected from natural pozzolans or metakaolin, or industrial inorganic by-products, for example, selected from ground granulated blast furnace slag, fly ash or any mixture thereof.

In Table 1, one can see the chemical composition of the ground granulated blast furnace slag that can be used according to the invention; likewise in Table 2, one can see the chemical composition of the fly ash that can be used in the invention.

TABLE 1

Chemical composition of the ground granulated blast furnace slag according to the invention

| Constituent | Weight Percent (m/m %) |
| --- | --- |
| Lime (CaO) | 30-45 |
| Magnesia (MgO) | 3-15 |
| Silica (SiO$_2$) | 30-45 |
| Alumina (Al$_2$O$_3$) | 5-20 |
| Sulfur (S) | 0-3 |
| Iron Oxide (Fe$_2$O$_3$) | 0-2 |
| Manganese Oxide (MnO) | 0-2 |

TABLE 2

Chemical composition of the fly ash according to the invention

| Constituent | Weight Percent (m/m %) |
| --- | --- |
| Lime (CaO) | 1-40 |
| Alumina (Al$_2$O$_3$) | 5-35 |
| Silica (SiO$_2$) | 15-60 |
| Iron Oxide (Fe$_2$O$_3$) | 4-40 |
| LOI (%) | 0-15 |

More preferably, the binder consists of 100% ground-granulated blast-furnace slag, 100% fly ash, or a mixture thereof, said mixture comprising between 60% to 100% of slag and 0% to 40% of fly ash.

No treatment of the binder is needed; both slag and fly ash can be used as received.

Another embodiment is the method of the invention, wherein the activator comprises alkaline reagents selected from the group composed by sodium silicates, sodium metasilicates, sodium hydroxide or a mixture thereof.

Preferably, if sodium metasilicates are used, these are pentahydrate sodium metasilicates. It was observed that the activation of slags and fly ashes is more efficient using any of the activators mentioned above or a mixture thereof.

Another embodiment is the method of the invention, wherein the ratio between the active solid content of the activator to the total binder content is located between 2% weight and 8% weight. This range will ensure that the binder is activated without having the extremely alkaline environment for the growth of vegetation.

Another embodiment is the method of the invention, wherein a superplastifier is added, in a quantity between 0.12 and 0.8% (m/m) of binder.

The water to binder ratio is comprised between 0.2 and 0.4 and the paste volume is comprised between 75 and 120 l/m$^3$.

The paste volume, together with the water-to-binder ratio and the aggregate size, ensures that the paste coats the aggregates, binding them together, guaranteeing that the voids are large enough and interconnected to aerate the root system—so that they do not asphyxiate and consequently, rot,—but small enough to guarantee water capillarity.

Aggregates from different origins and shapes can be used, being the most common ones natural siliceous rounded aggregates from river, lake or sea origin and limestone based crushed angular aggregates; other sources of aggregates include construction demolition waste and concrete demolition waste. Quartz, clay, expanded clay, glass, expanded glass or gravel can be used. Aggregates should be added between 1400 kg and 1600 kg per $m^3$. The most important properties to consider when choosing aggregates is their size and their natural packing solid percentage: aggregates should have a Dmax below 6 mm, preferably below 4 mm (100% passing through sieve 4.75 mm (N° 4)), and a natural packing solid between 55% and 65% (v/v). If a natural packing solid between 55% and 65% (v/v) is achieved, the aggregates' shape is negligible.

The natural packing solid is the volume occupied by the solids without compaction per $m^3$.

Dmax is the maximum diameter of the aggregates used. It is defined according to EN 206 (2013) and it is declared as the value of the coarsest fraction of aggregate actually used in the concrete.

When choosing aggregates, ensuring that they are monogranular is another important factor to take into account. If the aggregates used are not monogranular, then finer aggregates will fill in the voids between the bigger aggregates and water permeability is not secured anymore. Roots that are growing within the porous substrate will asphyxiate in small pores. On the other hand, if pores are too big, capillarity does not occur and water does not reach the root system.

To ensure that the aggregates are monogranular, D90/D10 ratio should be comprised between 1 and 3.5. D10 and D90 are granulometry data derived from particle size distribution for the aggregates used: D90 is the sieve size [mm] at which 90% of the particles pass through, meaning that 90% of the aggregates will have a smaller size than D90 and 10% have a bigger size than D90.

Similarly, D10 is the sieve size [mm] at which 10% of the particles pass through, meaning that 10% of the aggregates will have a smaller size than D10 and 90% have a bigger size than D10. Consequently, D90/D10 is a monogranular index.

According to the present invention, D90 is located between 3 and 3.5 mm and D10 is equal or larger than 1.5 mm.

After guaranteeing a monogranular index, also D50 can be calculated, which indicates the average size of the aggregates used. This will help us predict the size of the voids; hence it plays an important role in determining the water permeability of the product. D50 is also a granulometry data derived from particle size distribution for the aggregates used, wherein D50 is the sieve size [mm] at which 50% of the particles go through, meaning that 50% of the aggregates will have a smaller size than D50 and 50% have a bigger size than D50. D50 is the average size of the aggregates. According to the present invention, D50 is equal or larger than 1 mm.

D90/D10 and D50 secure that no powders are added in the mix and guarantee that both the final voids size and percentage of voids are ideal to carry out the present invention.

In order to produce a Portland cement-free porous rigid mineral substrate to optimize plant germination and growth, with a final compressive strength after hardening between 3 MPa and 10 MPa and porosity between 25% and 35%, the following steps should be followed:

a) Mixing:
   a binder composed or consisting of pozzolanic material, said pozzolonic material representing 100% of the binder weight, with
   at least one alkaline activator and
   water, wherein the water-to-binder ratio is between 0.2 and 0.4, and
   between 1400 kg and 1600 kg of aggregates per $m^3$ of concrete, said aggregates with Dmax of 4 mm,
   whereas the aggregates have a D90/D10 comprised between 1 and 3.5, whereas D90 is selected to be located between 3 and 3.5 mm and the D10 is equal or larger than 1.5 mm, the aggregates being characterized by the fact that the natural packing solid is between 55% and 65% (v/v) and ensuring that the paste volume is between 75 and 120 $l/m^3$;

b) Pouring said mix a) into a mould:
   The mould has no restrictions in terms of size or shape; any mould with any size or shape can be used according to the invention, depending solely on the final desired product. For more convenience, a hole (0.5 mm diameter and up to ¼ to ⅛ deep of the substrate height) could be formed before hardening, to ensure a good seeding, although this step is not compulsory;

c) Curing the cement-free porous rigid mineral substrate:
   This step c) avoids water loss and cracks derived from drying. Curing is done by spraying or sprinkling water over the substrate surface or by steam curing (typically 60-70° C.), contributing to the strength gain of the product. When applying steam curing, this is preferably steam at atmospheric pressure;

d) Washing the cement-free porous rigid mineral substrate:
   Preferably, the method to wash the substrate can be one of three methods: still cold, hot pressure and cold pressure.

Still cold wash is performed by soaking the porous concrete in water or nutrient solution at room temperature (20° C.) for 24 hours. The soaking step is performed by introducing the cement-free porous rigid mineral substrate in water or nutrient solution, so that the liquid completely submerges the substrate. There should be 8 times more water than substrates by volume.

Hot pressure wash is performed using hot water (temperature between 50° C. and 60° C.) forced through the substrate at 50 PSI for 15 seconds.

Cold pressure wash is performed using room temperature (20° C.) water forced through the porous concrete at 50 PSI for 15 seconds.

The washing step has as main objective to neutralize the unreacted slag powder and surface ions from the substrate. Furthermore, the washing decreases the pH of the substrate from the initial value of 11 down to 8.

e) Placing the seed on the surface of the porous rigid mineral substrate:
   After the porous substrate is washed, seeds can be planted. One or two seeds should be planted by square inch area or species spacing dependent. When a hole has been made during the preparation of the substrates, the seeds can be placed inside;

f) Germination:
   Supplying water to the free porous rigid mineral substrate to enable germination of the seed in water or nutrient solution. The solution level should be maintained at ⅓ to ½ of the height of the substrate to ensure liquid throughout the substrate at all times when plants are being grown.

The step f) can be done using water without nutrients (for a few days up to maximum 7 days) since germination does not require nutrient in the soaking liquid until the first true leaf appears.

Preferably, however, the soaking step f) will be done with a nutrient solution, preferably a hydroponic nutrient solution. Preferably the hydroponic nutrient solution should be Hoagland solution (as in Table 3) or a modified Hoagland solution, based on the formulation in Table 4.

TABLE 3

Formulation of the Hoagland solution

| | Hoagland Nutrient Concentration |
|---|---|
| 1M $KNO_3$ | 0.51 g/L |
| 1M $Ca(NO_3)_2 \cdot 4H_2O$ | 1.18 g/L |
| 1M $MgSO_4 \cdot 7H_2O$ | 0.49 g/L |
| 1M $KH_2PO_4$ (pH to 6.0) | 0.14 g/L |
| $H_3BO_3$ | 2.86 mg/L |
| $MnCl_2 \cdot 4H_2O$ | 1.81 mg/L |
| $ZnSO_4 \cdot 7H_2O$ | 0.22 mg/L |
| $CuSO_4 \cdot 5H_2O$ | 0.08 mg/L |
| $Na_2MoO_4 \cdot 2H_2O$ | 0.12 mg/L |
| NaEDTA | 7.45 mg/L |
| $FeSO_4 \cdot H_2O$ | 5.57 mg/L |

TABLE 4

General nutrient formulation that can be used in step (f)

| | Nutrient Concentration Range |
|---|---|
| 1M KNO3 | 0.063-2.53 g/L |
| 1M Ca(NO3)2•4H2O | 0.15-5.90 g/L |
| 1M MgSO4•7H2O | 0.06-2.46 g/L |
| 1M KH2PO4 (pH to 6.0) | 0.02-0.7 g/L |
| H3BO3 | 0.36-14.3 mg/L |
| MnCl2•4H2O | 0.15-5.9 mg/L |
| ZnSO4•7H2O | 0.03-1.1 mg/L |
| CuSO4•5H2O | 0.01-0.4 mg/L |
| Na2MoO4•2H2O | 0.02-0.6 mg/L |
| NaEDTA | 0.93-37.3 mg/L |
| FeSO4•7H2O | 0.7-27.8 mg/L |

The Hoagland solution is a very well-known nutrient solution developed by Hoagland and Arnon in 1938; it provides the essential nutrients for plant growth and it is suitable for the growth of a large variety of plant species.

The porous substrates can be reused, one just needs to clean and remove the roots from the substrate, wash it and re-start the process at step d).

In the present invention, germination rate was measured as a ratio, by dividing the amount of plants germinated over the total population of substrates in the tray. Any plants that died during the experiment resulted in a reduced plant viability score.

The final growth of the substrates has been assessed by recording the fresh and dry mass of the plants at the end of the trial period (generally 28 days). The fresh mass corresponds to the total mass of the plant, from above the hypocotyl to the top of the plant. After complete drying at <100° C. for at least 48 hours in the oven, with less than 5% mass change between 6 hours of continued drying, the dry mass is also recorded and reported.

The Portland cement-free porous rigid mineral substrate can be casted or pre-casted horizontally or vertically, depending on the final application. Also, the Portland cement-free porous rigid mineral substrate can be used both in interior or exterior applications, including on-water applications, for example, wetlands.

List of Definitions

Hydroponics. The cultivation of plants by placing the roots in liquid nutrient solutions rather than in soil.

Aeroponics. Process of growing plants in air without the use of soil.

Pervious concrete, also called water permeable concrete or porous concrete. A non-conventional concrete since it has a high number of connected pores that allow water to go through it. Hence, it is normally used in surface applications, such as pavements, roads and roofs, to allow water flow and prevent flooding.

Hydraulic binder. It is a material with cementing properties that sets and hardens due to hydration even under water. Hydraulic binders produce calcium silicate hydrates also known as CSH.

Cement. It is a binder that sets and hardens and brings materials together. The most common cement is the ordinary Portland cement (OPC) and a series of Portland cements blended with other cementitious materials.

Ordinary Portland cement. Hydraulic cement made from grinding clinker with gypsum. Portland cement contains calcium silicate, calcium aluminate and calcium ferroaluminate phases. These mineral phases react with water to produce strength.

Paste. A mixture of binders, water, air and admixtures.

Gravel (coarse aggregates). Unconsolidated rock fragments having a size from 4 to 64 mm.

Aggregates. Particulate material used in construction. Can be divided into fine and coarse aggregates. Include sand, gravel, crushed stone, recycled concrete and geosynthetic aggregates.

Powder. Materials with granulometry up to 64 µm.

Hydration. It is the mechanism through which OPC or other inorganic materials react with water to develop strength. Calcium silicate hydrates are formed and other species like ettringite, monosulfate, Portlandite, etc.

Concrete Ingredients. Concrete is primarily a combination of hydraulic binder, sand, fine and/or coarse aggregates, water. Admixture can also be added to provide specific properties such as flow, lower water content, acceleration, etc.

Admixture. Chemical species used to modify or improve concrete's properties in fresh and hardened state. These could be air entrainers, water reducers, set retarders, superplasticizers and others.

Superplasticizers. It relates to a class of chemical admixture used in hydraulic cement compositions such as Portland cement concrete having the ability to highly reduce the water demand while maintaining a good dispersion of cement particles. In particular, superplasticizers avoid particle aggregation and improve the rheological properties and workability of cement and concrete at the different stage of the hydration reaction.

Hardened concrete. Concrete in the solid state which has developed a certain strength. Opposite to unhardened concrete.

Strength development—setting/hardening. The setting time starts when the construction material changes from plastic to rigid. In the rigid stage the material cannot be poured or moved anymore. After this phase the strength development corresponding to the hardening of the material.

Flexural strength. Measure of the tensile strength of concrete. It measures the resistance to failure in bending.

According to the norm ASTM C78, the four point bending test is performed by loading 150×150 mm unreinforced concrete beams with a span length of three times the depth. According to EN12390, the test is done in three points.

Flexural resistance. Resistance of a structure against external load that can induce a bending solicitation to it.

Compressive strength. Capacity of a material or structure to withstand compressive loads. American Society for Testing Materials ASTM C39/C39M provides Standard Test Method for Compressive Strength of Cylindrical Concrete Specimens. Concrete compressive strength requirements can vary from 15 MPa for pavements to 100 MPa and higher in commercial structures.

Permeability. The capacity of a porous material to allow fluids to pass through it.

Mineral Addition. Mineral admixture (including the following powders: silica fume, fly ash, slags) added to concrete to enhance fresh properties, compressive strength development and improve durability.

Silica fume. Source of amorphous silicon obtained as a byproduct of the silicon and ferrosilicon alloy production. Also known as microsilica.

Fibers. Material used to increase concrete's structural performance. Fibers include: steel fibers, glass fibers, synthetic fibers and natural fibers.

Fly ash. Also known as Alumino silicate-by-product. Alkali reactive binder components that together with the activator form the cementitious paste. These minerals are rich in alumina and silica in both, amorphous and crystalline structure.

Slag. Also called Ground-granulated blast-furnace slag (GGBS or GGBFS). Produced by quenching molten iron slag from a blast furnace in water or steam. It is produced as a granular product which is then ground into a fine powder with pozzolanic properties.

Pozzolans. Siliceous or siliceous and aluminous materials which, when finely divided and in the presence of water, react chemically with calcium hydroxide to form compounds with cementitious properties. Fly ash and slag are common pozzolans.

Filler inert. Material that does alter physical properties of concrete but does not take place in hydration reaction.

Silicate. Generic name for a series of compounds with formula $Na_2O.nSiO_2$. Fluid reagent used as alkaline liquid when mixed with sodium hydroxide. Usually sodium silicate but can also comprise potassium and lithium silicates. The powder version of this reagent is known as metasilicates and could be pentahydrates or nonahydrates. LOI. Lost on Ignition. Test used in inorganic chemistry that consists of strongly heating ("igniting") a sample of the material at a specified temperature, allowing volatile substances to escape, until its mass ceases to change.

Water-to-binder equivalent. Also designated "water/(cement+k×addition) ratio". Allows to take into account type II additions (such as silica fume, fly ash or blastfurnace slag) in the water-binder ratio. The definition and k values for the additions are described in the norm EN 206 2013.

Workability. The time period within which the material is not yet set and can therefore be handled, placed, leveled and compacted.

Workability retention. It is the capability of a mix to maintain its workability during the time. The total time required depends on the application and the transportation.

Alkali Activated cements. Low or zero clinker cements activated by the use of caustic alkalis or alkaline salts.

Sodium Hydroxide. It is an inorganic compound with formula NaOH also known as caustic soda or lye that is used for chemical activation. Sodium hydroxide is referred as Activator 1 in examples in this application.

PCE. Polycarboxylic Acid Co-Polymers used as a class of cement and concrete admixtures, and are comb type polymers that are based on: a polymer backbone made of acrylic, methacrylic, maleic acid, and related monomers, which is grafted with polyoxyalkylene side-chain such as EO and/or PO. The grafting could be, but is not limited to, ester, ether, amide or imide.

Coarse Aggregates. Manufactured, natural or recycled minerals with a particle size greater than 8 mm and a maximum size lower than 32 mm.

Fine Aggregates. Manufactured, natural or recycled minerals with a particle size greater than 4 mm and a maximum size lower than 8 mm.

Sand (fine aggregates). Manufactured, natural or recycled granular material composed of finely divided rock and mineral particles. Have a minimum size of 64 μm and a maximum size lower than 4 mm.

Particle size distribution (PSD). List of values that define the relative amount, typically by mass, of particles present in a sample according to size.

Natural packing solid. The volume occupied by the solids without compaction per $m^3$.

Dmax. Defined according to EN 206 (2013). It is the declared value of the coarsest fraction of aggregate actually used in the concrete.

Aluminosilicates. Minerals composed of aluminium, silicon, and oxygen. Metakaolin is an example of an aluminosilicate.

Metakaolin. Formula: $Al_2O_3.2SiO_2$. Dehydroxylated aluminum silicate. It is an amorphous non-crystallized material made up of lamellar particles.

Electro conductivity (EC). The ability of a solution to conduct an electrical current. Measuring the electrical conductivity (EC) of the water is a normal method to quantify the concentration of salts. Excessively high salinity can affect plants, either if one particular ion is toxic for the plant (for example, sodium), or by inducing a higher osmotic pressure around the roots, inhibiting an efficient water absorption by the plant.

Germination rate. Measured as a ratio, by dividing the amount of plants germinated over the total population of substrates in the tray. Any plants that died during the experiment resulted in a reduced plant viability score.

Fresh and dry mass. The fresh mass corresponds to the total mass of the plant, from above the hypocotyl to the top of the plant. After complete drying at <100° C. for at least 48 hours in the oven, with less than 5% mass change between 6 hours of continued drying, the dry mass is also recorded and reported.

Growth rate. After a seed has germinated, it starts to grow. Hence when germination rate reaches a plateau, it means the plants have entered into growing phase.

EXAMPLES

Example 1

Figure 1:
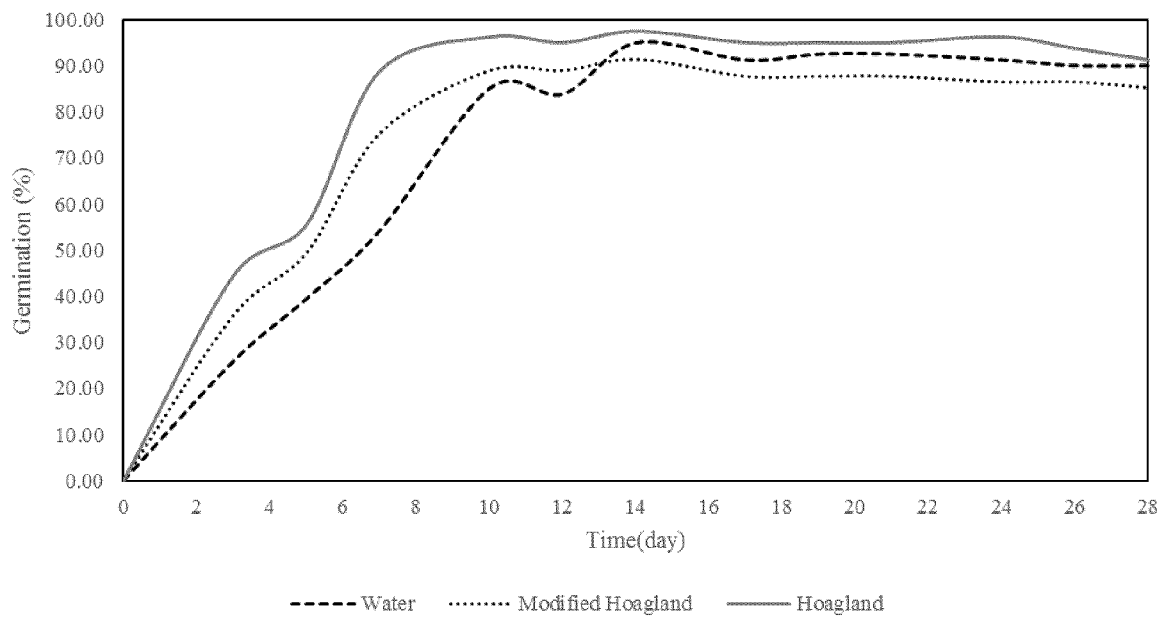
FIG. 1 represents the germination rate using three different washing liquids (water, modified Hoagland solution and Hoagland solution).

Three porous substrates were manufactured using the same mix design:

TABLE 5

| Mix design for the three porous substrates | |
|---|---|
| Binder (Slag) | 187 kg/m$^3$ |
| w/b | 0.3 |
| Activator NaOH 50% m/m | 3.7% (m/m) |
| Activator Na$_2$SiO$_3$ 40% m/m | 5.2% (m/m) |
| Gravel (2/3.2 mm) | 1478 kg/m$^3$ |
| Paste volume | 120 l/m$^3$ |

TABLE 6

| Chemical composition and fineness of ground granulated blast furnace slag by X- ray Fluorescence | |
|---|---|
| SiO$_2$ (%) | 33.98 |
| Al$_2$O$_3$ (%) | 14.70 |
| Fe$_2$O$_3$ (%) | 1.46 |
| CaO (%) | 42.08 |
| MgO (%) | 3.97 |
| SO$_{35}$ (%) | 1.63 |
| Na$_2$O (%) | 0.18 |
| K$_2$O (%) | 0.31 |
| TiO$_2$ (%) | 0.58 |
| P$_2$O$_5$ (%) | 0.02 |
| Mn$_2$O$_3$ (%) | 0.34 |
| LOI 950 C. (%) | −0.87 |
| Sum (%) | 98.37 |
| D10 (μm) | 3.2 |
| D50 (μm) | 13.9 |
| D90 (μm) | 37.8 |
| 45 μm retained (%) | 6.21 |

The ingredients were mixed until uniform before being poured into three different moulds. The moulds had a cubic shape, each had 4 cm$^3$ of volume. The samples were steam cured at 60 to 70° C. for 8 to 16 hours and placed in the curing chamber for 7 days before demoulded.

The substrates were then washed in the following 3 different solutions, as described in step d) "Still Cold Wash":
1. one substrate was washed with Hoagland nutrient solution (treatment 1),
2. the second substrate was washed with a modified Hoagland nutrient solution with an increased concentration of KH$_2$PO$_4$ (1.1 mol/L) (whereas the KH$_2$PO$_4$ concentration in the traditional Hoagland nutrient solution is 1M) (treatment 2)
3. and the third substrate was washed with water (treatment 3).

Figure 2:
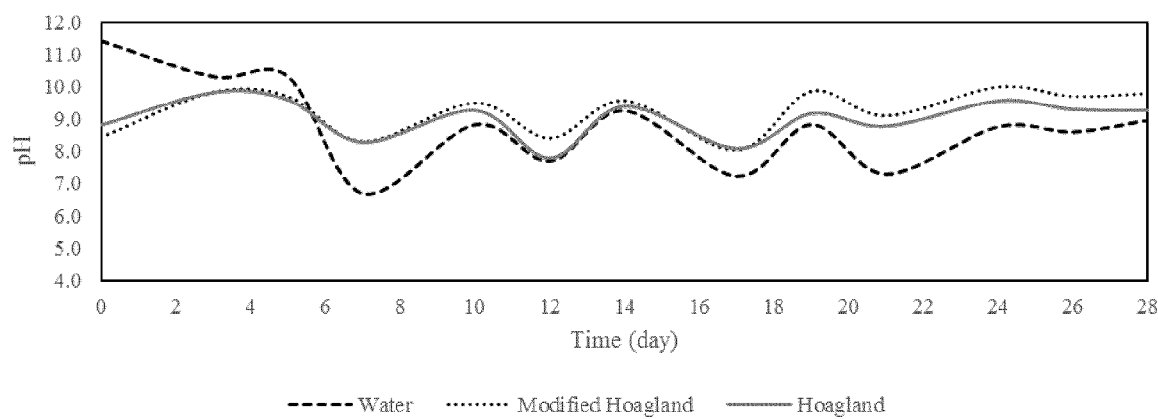
FIG. 2 represents the pH profile for the three different washing liquids (water, modified Hoagland solution and Hoagland solution).
Figure 3:
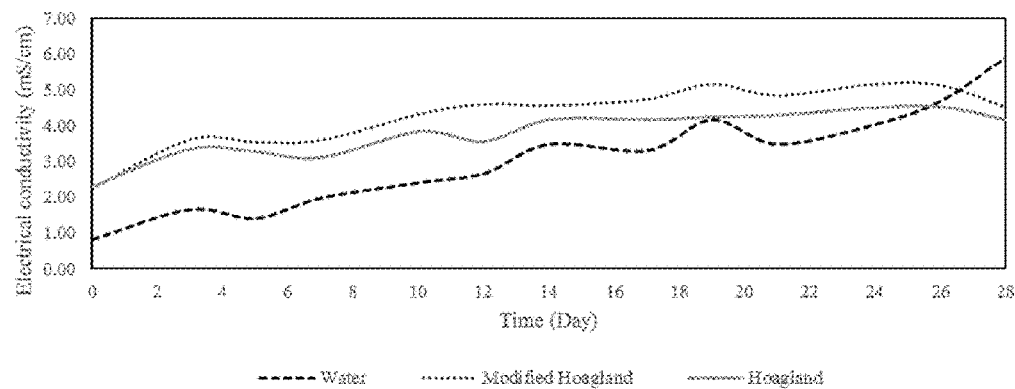
FIG. 3 represents the electrical conductivity profile for Example 1.

The substrates were then seeded according to step e) and germinated according to step f) for a period of 28 days in their respective washing solution (substrate 1 was soaked in Hoagland nutrient solution, substrate 2 was soaked in Modified Hoagland solution and substrate 3 was soaked in water). For the substrate 3, Hoagland solution was introduced only at day 7 to guarantee sufficient nutrients. The germination rate (FIG. 1), pH (FIG. 2) and EC (FIG. 3) were monitored over time.

Example 2—Different Binder: Using Fly Ash C

Porous substrates were manufactured using the following mix design:

TABLE 7

| Mix design for the three porous substrates | |
|---|---|
| Binder (Fly Ash - C) | 183 kg/m$^3$ |
| w/b | 0.29 |
| Activator NaOH 50% m/m | 6.9% (m/m) |
| Activator Na$_2$SiO$_3$ 40% m/m | 10.2% (m/m) |
| Gravel (2/3.2 mm) | 1455 kg/m$^3$ |
| Paste volume | 120 l/m$^3$ |

TABLE 8

| Chemical composition and fineness of fly ash type C by X- ray fluorescence | |
|---|---|
| SiO$_2$ (%) | 36.49 |
| Al$_2$O$_3$ (%) | 19.41 |
| Fe$_2$O$_3$ (%) | 6.10 |
| CaO (%) | 23.53 |
| MgO (%) | 5.10 |
| SO$_3$ (%) | 1.00 |
| Na$_2$O (%) | 3.05 |
| K$_2$O (%) | 0.46 |
| TiO$_2$ (%) | 1.49 |
| P$_2$O$_5$ (%) | 0.73 |
| Mn$_2$O$_3$ (%) | 0.03 |
| LOI 950 C. (%) | 0.99 |
| Sum (%) | 99.71 |
| D10 (μm) | 1.9 |
| D50 (μm) | 12.9 |
| D90 (μm) | 66.0 |
| 45 μm retained (%) | 17.66 |

The ingredients were mixed until uniform before being poured into the moulds. The moulds had a cubic shape, each had 4 cm$^3$ of volume. The samples were steam cured at 60 to 70° C. for 8 to 16 hours and placed in the curing chamber for 7 days before demoulded. After the porous substrate has been washed according to the procedure described in example 1, using Hoagland solution (treatment 1), two seeds are planted by square inch area or species spacing dependent. The Hoagland nutrient solution level was maintained at ⅓ of the height of the substrate to ensure solution throughout the substrate at all times by capillarity when plants are being grown.

Figure 4:
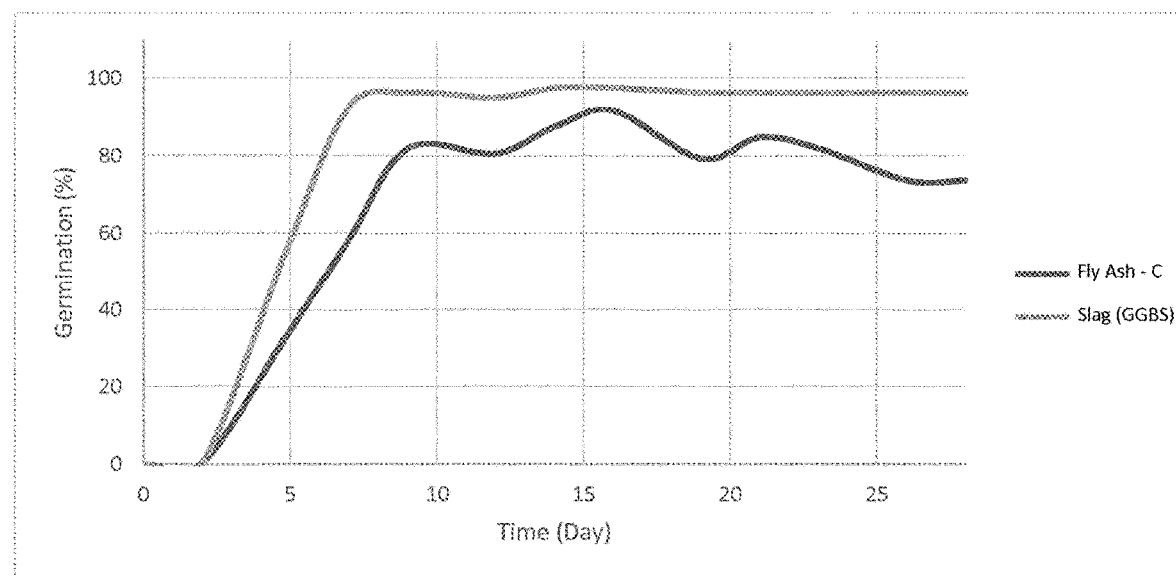
FIG. 4 represents the germination rate between GGBS and Fly Ash type C.
Figure 5:
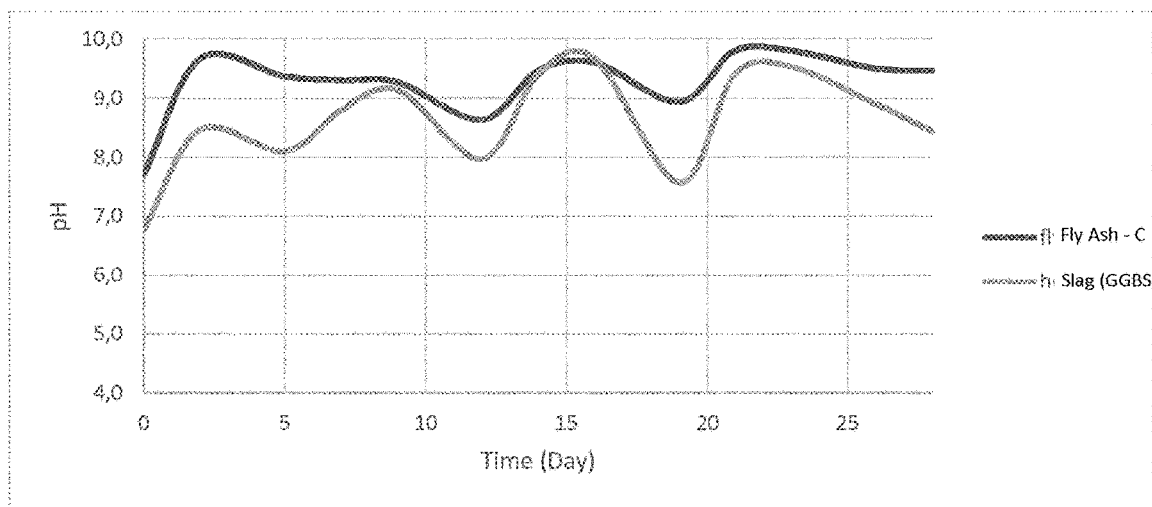
FIG. 5 represents the evolution of pH during plant growth between GGBS and Fly Ash type C.

Germination rate as compared to the GGBS based substrates was comparable as shown on FIG. 4 below, although maximum reached was about 90%. FIG. 4 shows the germination rate after the soaking step f), wherein time 0 is the day when the seeds were placed on the substrate.

pH also appeared to be similar than GGBS, ranging between 8 and 10 as described on FIG. 5.

Example 3—Aggregates with Bigger Size

Porous substrates were manufactured using the following mix design:

TABLE 9

Mix design for the three porous substrates

| | |
|---|---|
| Binder (Slag) | 182 kg/m$^3$ |
| w/b | 0.35 |
| Activator NaOH 50% m/m | 3.7% (m/m) |
| Activator Na$_2$SiO$_3$ 40% m/m | 5.2% (m/m) |
| Gravel (8/11 mm) | 1400 kg/m$^3$ |
| Paste volume | 120 l/m$^3$ |

TABLE 10

Chemical composition and fineness of ground granulated blast furnace slag by X- ray diffraction

| | |
|---|---|
| SiO$_2$ (%) | 33.98 |
| Al$_2$O$_3$ (%) | 14.70 |
| Fe$_2$O$_3$ (%) | 1.46 |
| CaO (%) | 42.08 |
| MgO (%) | 3.97 |
| SO$_{35}$ (%) | 1.63 |
| Na$_2$O (%) | 0.18 |
| K$_2$O (%) | 0.31 |
| TiO$_2$ (%) | 0.58 |
| P$_2$O$_5$ (%) | 0.02 |
| Mn$_2$O$_3$ (%) | 0.34 |
| LOI 950 C. (%) | −0.87 |
| Sum (%) | 98.37 |
| D10 (μm) | 3.2 |
| D50 (μm) | 13.9 |
| D90 (μm) | 37.8 |
| 45 μm retained (%) | 6.21 |

The ingredients were mixed until uniform before being poured into the moulds. The moulds had a cubic shape, each had 4 cm$^3$ of volume. The samples were steam cured at 60 to 70° C. for 8 to 16 hours and placed in the curing chamber for 7 days before demoulded. After the porous substrate has been washed according to the procedure described in example 1 (treatment 1), using Hoagland solution, one or two seeds are planted by square inch area or species spacing dependent. The Hoagland nutrient solution level was maintained to ensure solution throughout the substrate at all times by capillarity when plants are being grown.

Figure 6:
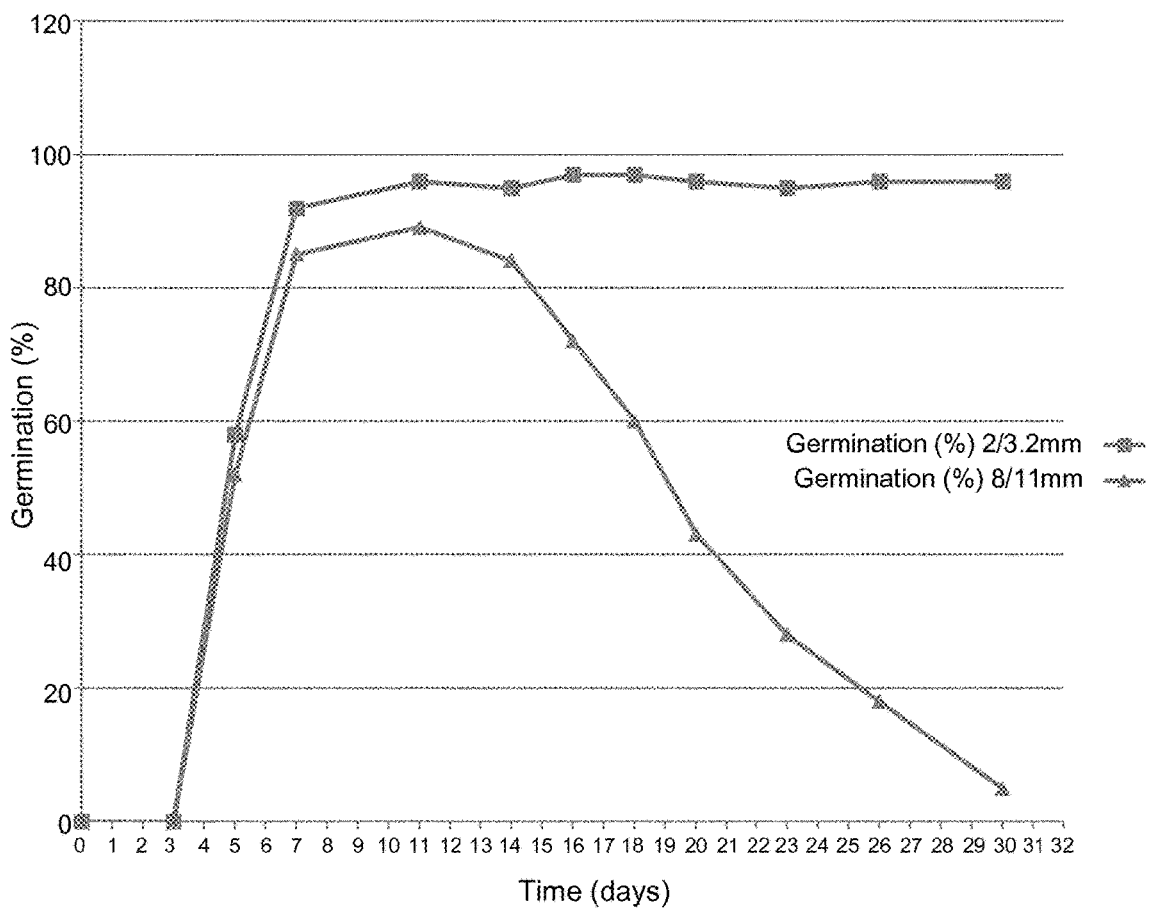
FIG. 6 represents the germination rate between 2/3.2 mm and 8/11 mm aggregates.

Germination rate with 8/11 mm aggregates showed a significant decrease in efficiency (FIG. 6) as compared to the use of 2/3.2 mm aggregates, which could be related to the capillarity absorption and water retention of the substrate, as shown on Table 11. Due to the bigger void size, the water is not retained by the porous substrate and cannot support the germination and growth of the seeds. Only the germination can be supported by the nutrient already provided in the seeds, but after 7 days, the plants started to die by lack of water and nutrients in the porous structure, since capillarity could not occur due to the big size of the pores. Such performance renders the use of bigger size aggregates, above 4 mm, incompatible with hydroponic systems. FIG. 6 shows the germination rate after the soaking step f), wherein time 0 is the day when the seeds were placed on the substrate. Germination with 2/3.2 mm has reached a plateau, which means that more than 95% of the seeds have not only germinated but have continued to develop, reaching a growing stage.

TABLE 11

Water absorption, retention and drained for porous substrates (measured on 110 × 220 mm cylinder samples)

| Aggregate size | 2/3.2 mm | 8/11 mm |
|---|---|---|
| Water Absorption (%) | 34 | 34 |
| Water Retained (%) | 10 | 3 |
| Water Drained (%) | 23 | 31 |

To determine "Water Absorption", "Water Retained" and "Water Drained", cylinders of 11×22 mm of the same porous material as the substrates, have been manufactured. The substrates are first weighted when totally dry and the water absorption is measured according to norm ASTM C 1745. After all the voids have been filled with water, the cylinders are rapidly removed from the liquid. Water starts pouring from the cylinder, due to its open porosity, and this water is directly collected and measured, leading to "Water Drained". When no more water pours out, the cylinder is again weighted. The difference between this wet cylinder and the dried cylinder leads to "Water Retained".

Example 4—Aggregate Below 4 mm, but Having 090-D50-D10 Outside the Invention Scope Porous substrates were manufactured using the following mix design:

TABLE 12

Mix design for the three porous substrates

| | |
|---|---|
| Binder (Slag) | 149 kg/m$^3$ |
| w/b | 0.35 |
| Activator NaOH 50% m/m | 3.7% (m/m) |
| Activator Na$_2$SiO$_3$ 40% m/m | 5.2% (m/m) |
| Gravel (0.3/0.9 mm) | 1489 kg/m$^3$ |
| Paste volume | 99 l/m$^3$ |

TABLE 13

Chemical composition and fineness of ground granulated blast furnace slag by X- ray diffraction

| | |
|---|---|
| SiO$_2$ (%) | 33.98 |
| Al$_2$O$_3$ (%) | 14.70 |
| Fe$_2$O$_3$ (%) | 1.46 |
| CaO (%) | 42.08 |
| MgO (%) | 3.97 |
| SO$_{35}$ (%) | 1.63 |
| Na$_2$O (%) | 0.18 |
| K$_2$O (%) | 0.31 |
| TiO$_2$ (%) | 0.58 |
| P$_2$O$_5$ (%) | 0.02 |
| Mn$_2$O$_3$ (%) | 0.34 |
| LOI 950 C. (%) | −0.87 |
| Sum (%) | 98.37 |
| D10 (μm) | 3.2 |
| D50 (μm) | 13.9 |
| D90 (μm) | 37.8 |
| 45 μm retained (%) | 6.21 |

The ingredients were mixed until uniform before being poured into the moulds. The moulds had a cubic shape, each had 4 cm$^3$ of volume. The samples were steam cured at 60 to 70° C. for 8 to 16 hours and placed in the curing chamber for 7 days before demoulded. After the porous substrate has been washed according to the procedure described in example 1, using Hoagland solution, one or two seeds are planted by square inch area or species spacing dependent. The Hoagland solution level was maintained to ensure liquid throughout the substrate at all times by capillarity when plants are being grown.

When aggregates with a size 0.3/0.9 mm were used, germination rate proved to be very similar to the one when 2/3.2 mm aggregates were used in the sense that all seeds developed successfully. However, none of the roots grew through the porous substrates and only developed from the outer layer, due to the very low size of the voids. The growth of the plants was allowed by a higher water retention that provides sufficient amounts of water and nutrients on the surface of the substrates. (see table 14)

TABLE 14

Water absorption, retention and drained for porous substrates (on 11 × 22 cm cylinder)

| Aggregate size | 2/3.2 mm | 0.3/0.9 mm |
|---|---|---|
| Water Absorption (v/v %) | 34 | 37 |
| Water Retained (%) | 10 | 21 |
| Water Drained (%) | 23 | 15 |

Example 5—Cement Based Material

Porous substrates were manufactured using the following mix design:

TABLE 15

Mix design for the three porous substrates

| Binder (CEM I 52.5R) | 111 kg/m³ |
|---|---|
| w/b | 0.35 |
| Superplasticizer | 1.5% (m/m) |
| Gravel (2/3.2 mm) | 1500 kg/m³ |
| Paste volume | 75 l/m³ |

TABLE 16

Chemical composition and fineness of CEM I 52.5R used by X- ray diffraction

| $SiO_2$ (%) | 19.46 |
|---|---|
| $Al_2O_3$ (%) | 4.71 |
| $Fe_2O_3$ (%) | 2.50 |
| CaO (%) | 63.55 |
| MgO (%) | 2.01 |
| $SO_3$ (%) | 2.63 |
| $Na_2O$ (%) | 0.07 |
| $K_2O$ (%) | 0.99 |
| $TiO_2$ (%) | 0.30 |
| $P_2O_5$ (%) | 0.26 |
| $Mn_2O_3$ (%) | 0.05 |
| SrO (%) | 0.08 |
| $Cr_2O_3$ (%) | 0.01 |
| ZnO (%) | 0.02 |
| LOI 950 C. (%) | 3.10 |
| Cl (%) | 0.01 |
| Sum (%) | 99.75 |
| D10 (μm) | 3.2 |
| D50 (μm) | 13.0 |
| D90 (μm) | 33.8 |
| 45 μm retained (%) | 3.66 |

The ingredients were mixed until uniform before being poured into the moulds. The moulds had a cubic shape, each had 4 cm³ of volume. The samples were steam cured at 60 to 70° C. for 8 to 16 hours and placed in the curing chamber for 7 days before demoulded. After the porous substrate has been washed according to the procedure described in example 1, using Hoagland solution, one or two seeds are planted by square inch area or species spacing dependent. The Hoagland solution level was maintained to ensure liquid throughout the substrate at all times by capillarity when plants are being grown.

Figure 7:
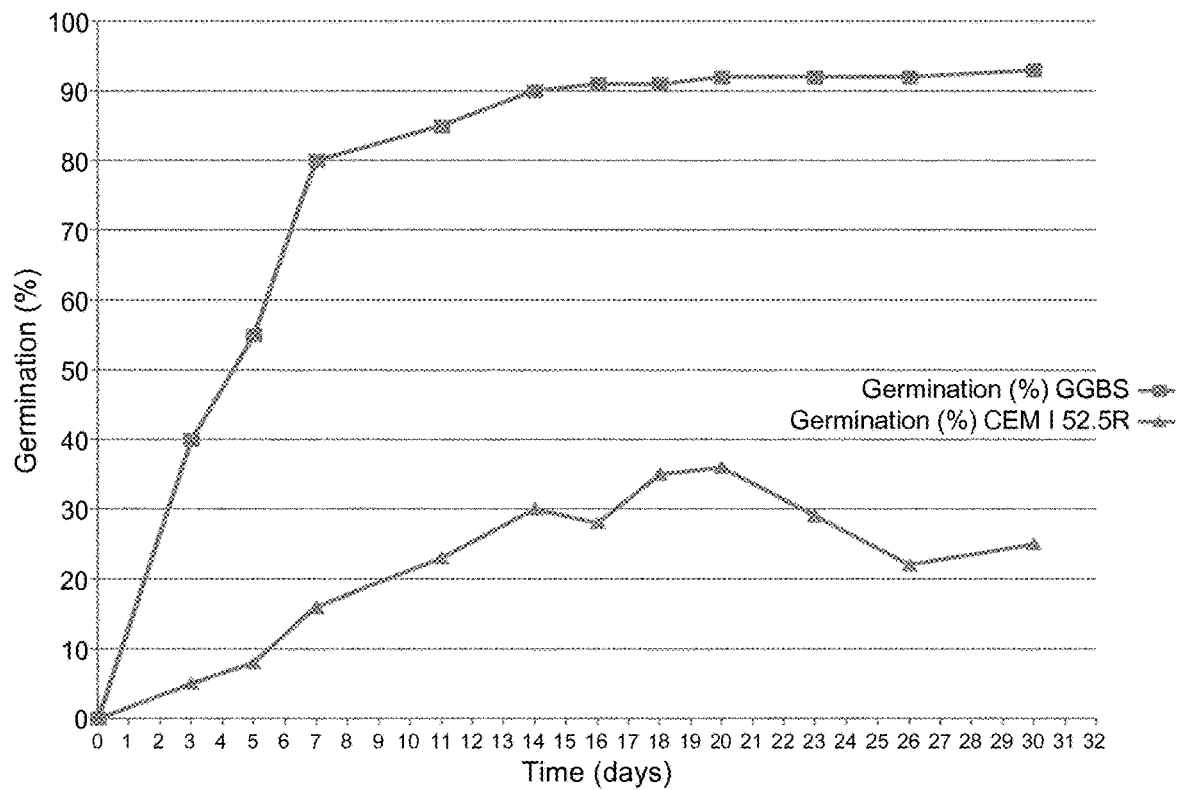
FIG. 7 represents the germination rate between GGBS and OEM based substrates.
Figure 8:
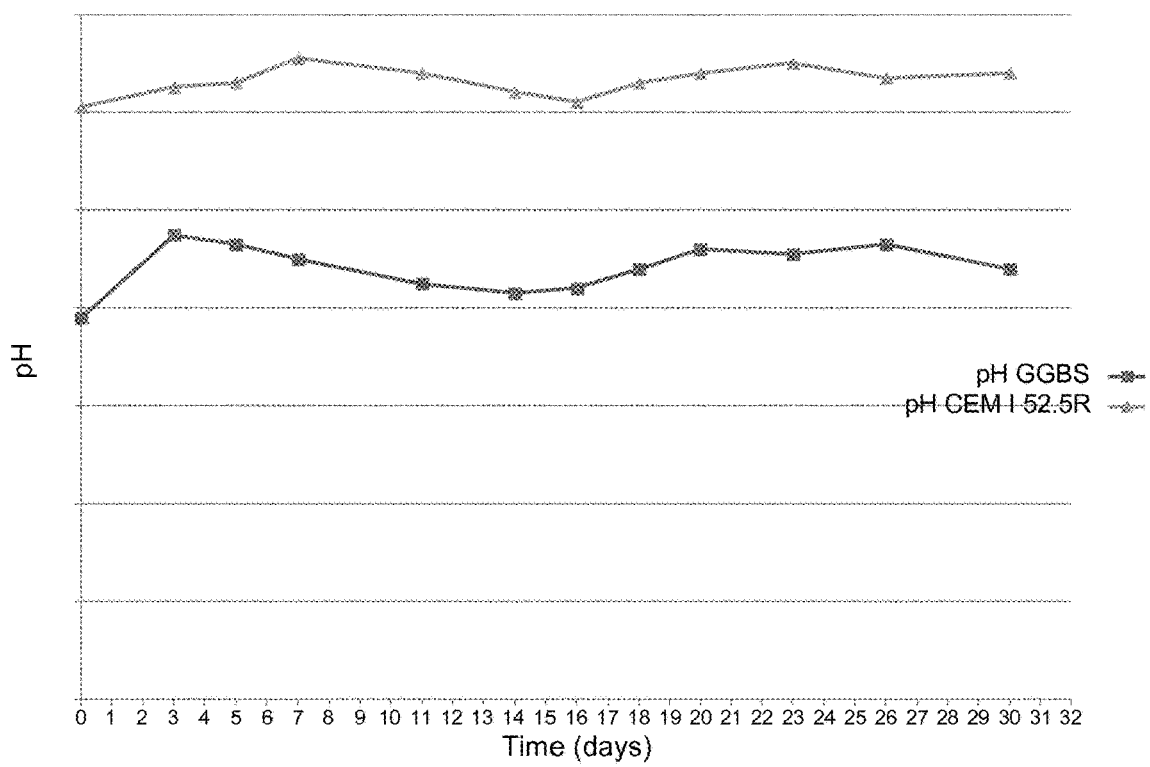
FIG. 8 represents the evolution of pH between GGBS and OEM based substrates during plant growth.

Germination rate as compared to the GGBS based substrates was significantly lower (<50%), and this due to the high pH (>12) released from the cement matrix rich in calcium ions (FIGS. 7 and 8). Germination was much slower for the cement based substrates and while some seed died, some other started to germinates, thus explaining the variation of the germination curve.

Example 6—Optimized Substrate with Radish

Porous substrates were manufactured using the following mix design:

TABLE 17

Mix design for the three porous substrates

| Binder (Slag) | 187 kg/m³ |
|---|---|
| w/b | 0.3 |
| Activator NaOH 50% m/m | 3.7% (m/m) |
| Activator $Na_2SiO_3$ 40% m/m | 5.2% (m/m) |
| Gravel (2/3.2 mm) | 1478 kg/m³ |
| Paste volume | 120 l/m³ |

TABLE 18

Chemical composition and fineness of ground granulated blast furnace slag by X- ray diffraction

| $SiO_2$ (%) | 33.98 |
|---|---|
| $Al_2O_3$ (%) | 14.70 |
| $Fe_2O_3$ (%) | 1.46 |
| CaO (%) | 42.08 |
| MgO (%) | 3.97 |
| $SO_{35}$ (%) | 1.63 |
| $Na_2O$ (%) | 0.18 |
| $K_2O$ (%) | 0.31 |
| $TiO_2$ (%) | 0.58 |
| $P_2O_5$ (%) | 0.02 |
| $Mn_2O_3$ (%) | 0.34 |
| LOI 950 C. (%) | −0.87 |
| Sum (%) | 98.37 |
| D10 (μm) | 3.2 |
| D50 (μm) | 13.9 |
| D90 (μm) | 37.8 |
| 45 μm retained (%) | 6.21 |

The ingredients were mixed until uniform before being poured into the moulds. The moulds had a cubic shape, each had 4 cm³ of volume. The samples were steam cured at 60 to 70° C. for 8 to 16 hours and placed in the curing chamber for 7 days before demoulded. After the porous substrate has been washed according to the procedure described in example 1, using a modified Hoagland solution, one or two seeds are planted by square inch area or species spacing dependent. The Hoagland solution level was maintained to ensure liquid throughout the substrate at all times by capillarity when plants are being grown.

The plant growth, by means of the fresh and dry mass of the plant, was compared after a growing period of 30 days after seeding, between the GGBS based substrates and rockwool which is considered as the market benchmark. As it can be observed in the table 19 below, plant growth was similar even exceeding rockwool.

TABLE 19

Fresh and dry mass of the radishes

|  | GGBS Substrate | Rockwool Benchmark |
|---|---|---|
| Fresh mass (g/plant) | 1.56 | 1.85 |
| Dry mass (g/plant) | 0.153 | 0.128 |

The invention claimed is:

1. A Portland cement-free porous rigid mineral substrate, with a final compressive strength after hardening between 3 MPa and 10 MPa and porosity between 25% and 35%, comprising:
    a binder consisting of pozzolanic material;
    at least one alkaline activator;
    a water-to-binder ratio between 0.2 and 0.4;
    a paste volume between 75 and 120 l/m;
    between 1400 kg and 1600 kg of aggregates per m$^3$ of concrete, said aggregates with Dmax of 4 mm,
    whereas the aggregates have a D90/D10 comprised between 1 and 3.5, whereas D90 is selected to be between 3 and 3.5 mm and the D10 is equal or larger than 1-0.5 mm, the aggregates being characterized wherein a natural packing solid is between 55% and 65% (v/v).

2. A substrate according to claim 1, wherein the binder consists of aluminosilicate minerals, selected from natural pozzolans or metakaolin, or industrial inorganic by-products selected from ground granulated blast furnace slag, fly ash or any mixture thereof.

3. A substrate according to claim 1, wherein the binder consists of 100% ground granulated blast-furnace slag, 100% fly ash, or a mixture of 60% to 100% of slag and 0% to 40% of fly ash.

4. A substrate according to claim 1, wherein the at least one activator comprises alkaline reagents selected from the group consisting of sodium silicates, sodium metasilicates, sodium hydroxide or a mixture thereof.

5. A substrate according to claim 1, wherein the ratio between a solid active content of the activator and the total binder content is located between 2 weight % and 8 weight %.

6. A substrate according to claim 1, wherein a superplastifier is present, in a quantity between 0.12 and 0.8% (m/m) of binder.

7. A method for plant germination and growth comprising placing a seed in or on the Portland cement-free porous rigid mineral substrate according to claim 1.

8. Method for preparing a Portland cement-free porous rigid mineral substrate as defined in claim 1, comprising:
    a) mixing:
    a binder consisting of pozzolanic material;
    at least one alkaline activator;
    water in an amount effective to provide a water-to-binder ratio between 0.2 and 0.4;
    between 1400 kg and 1600 kg of aggregates per m$^3$ of concrete, said aggregates with Dmax of 4 mm;
    whereas the paste volume is between 75 and 120 l/m$^3$;
    whereas the aggregates have a D90/D10 comprised between 1 and 3.5, whereas D90 is selected to be between 3 and 3.5 mm and the D10 is equal or larger than 1-0.5 mm, the aggregates being characterized wherein a natural packing solid is between 55% and 65% (v/v);
    b) pouring the mix obtained in step a) into a mould;
    c) curing the moulded mix; and
    d) washing the cement-free porous rigid mineral substrate obtained in step c).

9. Method according to claim 8, further comprising a step b') of forming a hole in the moulded mix for seeding, after step b) and before step c).

10. Method according to claim 8, further comprising the following steps:
    e) placing a seed on the surface of the Portland cement-free porous rigid mineral substrate;
    f) supplying water or a nutrient solution to the Portland cement-free porous rigid mineral substrate for germination of the seed.

11. Method according to claim 10, wherein the water or nutrient solution supplied in step f) is maintained at a level of ⅓ to ½ of a height of the substrate.

12. The method according to claim 9, further comprising the following steps:
    e) placing a seed on the surface of the Portland cement-free porous rigid mineral substrate;
    f) supplying water or a nutrient solution to the Portland cement-free porous rigid mineral substrate for germination of the seed.

13. The method according to claim 12, wherein the water or nutrient solution supplied in step f) is maintained at a level of ⅓ to ½ of a height of the substrate.

14. The method of claim 7, further comprising supplying water or a nutrient solution to the Portland cement-free porous rigid mineral substrate for germination and growth of the seed.

15. The method according to claim 14, wherein the water or nutrient solution supplied is maintained at a level of ⅓ to ½ of a height of the substrate.

* * * * *